United States Patent
Scheuer

(10) Patent No.: US 11,481,298 B2
(45) Date of Patent: Oct. 25, 2022

(54) COMPUTING CPU TIME USAGE OF ACTIVITIES SERVICED BY CPU

(71) Applicant: SAP SE, Walldorf (DE)

(72) Inventor: Tobias Scheuer, Bruchsal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/657,421

(22) Filed: Mar. 13, 2015

(65) Prior Publication Data

US 2016/0210170 A1 Jul. 21, 2016

Related U.S. Application Data

(60) Provisional application No. 62/105,555, filed on Jan. 20, 2015.

(51) Int. Cl.
*G06F 11/30* (2006.01)
*G06F 11/34* (2006.01)
*G06F 17/40* (2006.01)

(52) U.S. Cl.
CPC ...... *G06F 11/3024* (2013.01); *G06F 11/3419* (2013.01); *G06F 11/3476* (2013.01); *G06F 17/40* (2013.01)

(58) Field of Classification Search
CPC ........................................................ G06F 9/50
USPC ........................................................ 718/104
See application file for complete search history.

(56) References Cited

U.S. PATENT DOCUMENTS

| | | | | |
|---|---|---|---|---|
| 7,631,308 B2* | 12/2009 | Bishop | ................ | G06F 9/30101 718/102 |
| 2005/0188189 A1* | 8/2005 | Yeung | ................... | G06F 1/3203 713/1 |
| 2013/0117747 A1* | 5/2013 | Balko | ..................... | G06F 9/466 718/100 |
| 2014/0181837 A1* | 6/2014 | Vajapeyam | ........... | G06F 9/5033 718/107 |

OTHER PUBLICATIONS

"Getting Thread CPU Usage Using PerfMon"; Voxtron.com developer website (developer.voxtron.com); Jun. 24, 2014.*

(Continued)

*Primary Examiner* — Wei Y Zhen
*Assistant Examiner* — Clint Thatcher
(74) *Attorney, Agent, or Firm* — Mintz Levin Cohn Ferris Glovsky and Popeo, P.C.

(57) ABSTRACT

Processor(s) of a sampling profiler can identify an activity of multiple activities serviced by a central processing unit (CPU). Each activity can be performed by computing thread(s) of multiple computing threads executing various subroutines of a computer program. The processor(s) can set a target representing a total number of computing threads required to work simultaneously for a maximal use of the CPU. The processor(s) can determine a number of busy computing threads that are performing the activity by using the CPU. The processor(s) can calculate a number of wasted computing threads that are not performing the activity and not using the CPU by computing a difference between the target and the number of busy threads. The processor(s) can compute a CPU time usage for the activity by multiplying time duration of the activity by a value obtained by dividing the number of wasted threads by the number of busy threads.

17 Claims, 5 Drawing Sheets

(56) References Cited

OTHER PUBLICATIONS

"Thread (Computing)"; Wikipedia.org website; Jan. 12, 2015.*
"Multicore and Multithreading Performance (The Multicore Myth?)"; Scali's OpenBlog (https://scalibq.wordpress.com); Jun. 1, 2012.*

* cited by examiner

COMPUTING CPU TIME USAGE OF ACTIVITIES SERVICED BY CPU

CROSS REFERENCE TO RELATED APPLICATION

The current application is related to/claims priority under 35 U.S.C. § 119(e) to U.S. provisional application No. 62/105,555 filed on Jan. 20, 2015, the disclosure of which is incorporated by reference herein.

TECHNICAL FIELD

The subject matter described herein relates a sampling-based CPU profiler that determines a central processing unit (CPU) time usage for at least one activity of a plurality of activities serviced by a CPU in order to identify times when the CPU is idle.

BACKGROUND

Some conventional profilers collect data about a collective usage of central processing units (CPUs) for an entire set of activities services by those CPUs. However, such traditional profilers do not identify a usage of each CPU individually. A mere collective usage of the CPUs can be disadvantageous when some of the CPUs may be idle while other CPUs are working. When some of the CPUs are idle and others active, a determination that a collective set of CPUs is active can falsely indicate that each CPU is active. Further, these conventional profilers merely detect the CPU usage for the entire set of activities rather than for each individual activity. Detection of the CPU usage for the entire activities collectively alone can be disadvantageous, as this does not give any idea about which activities are using the CPU and which are not. Thus, collecting data about a collective usage of central processing units (CPUs) for an entire set of activities serviced by those CPUs reveals neither CPU hotspots (for example, times when the CPU is used excessively—that is, more than a threshold value) nor portions of a programming code (which when executed executes the activities) that excessively use the CPUs. However, if the data regarding CPU hotspots and portions of a programming code that excessively use the CPUs was available, a developer could use this data to modify the programming code in order to enhance performance.

SUMMARY

A CPU profiler is described that can collect data about usage of central processing units (CPUs) by various activities or threads. More particularly, the CPU profiler can identify CPU hotspots (for example, times when the CPU is used excessively—that is, more than a threshold value) and portions of a programming code (which when executed executes the activities) that excessively use the CPUs. Additionally, the CPU profiler can identify specific portions of the programming code that can are executed serially. The CPU profiler can also identify portions of the code when only a few threads do concurrent work while some CPUs are idle when those CPUs can potentially do work.

In one aspect, at least one processor of a computing system can identify an activity of a plurality of activities serviced by a central processing unit (CPU). Each activity can be performed by one or more computing threads of a plurality of computing threads executing a plurality of subroutines of a computer program. The at least one processor can set a target representing a total number of computing threads that are required to work simultaneously for a maximal use of the CPU. The at least one processor can determine a number of busy computing threads that are performing the activity by using the CPU. The at least one processor can calculate a number of wasted computing threads that are not performing the activity and not using the CPU by computing a difference between the target and the number of busy threads. The at least one processor can generate a CPU time usage for the activity by multiplying a time duration of the activity by a value obtained by dividing the number of wasted threads by the number of busy threads. The at least one processor can provide data including the CPU time usage.

In some variations, one or more of the following can be additionally implemented either individually or in any suitable combination. The one or more computing threads for one or more activities can include at least two computing threads that operate in parallel. At least one processor can sample the computing program such that at least one sample is generated for each computing thread. The generating of at least one sample for each computing thread can enable: the determining of the number of busy threads, the calculating of the number of wasted threads, and the generating of the CPU time usage, for each computing thread. The CPU time can be sent to a computing device that is external to the computing system. The CPU time usage for the activity can be used (for example, by a developer) to modify execution of the computer program. The modified execution of the computer program can be more efficient than execution of the computer program before the modification. The CPU can be one of a plurality of CPUs. Each of the CPU and the plurality of CPUs can be maximally used when the number of busy threads is equal to the target. The providing of the data including the CPU time usage can include at least one of: causing the CPU time usage to be rendered in a graphical user interface operatively coupled to the at least one processor, storing the data including the CPU time usage in a database operatively coupled to the at least one processor, storing the data including the CPU time usage into a memory operatively coupled to the at least one processor, and transmitting the data including the CPU time usage to another computing system that is remote from the computing system.

In another aspect, a non-transitory computer program product can store instructions that, when executed by at least one programmable processor of a computing system, can cause the at least one programmable processor to perform the following operations discussed below. A plurality of activities serviced by a central processing unit (CPU) at different times can be identified. Each activity can be performed by one or more computing threads of a plurality of computing threads executing a plurality of subroutines of a computer program. A target representing a total number of computing threads that should work simultaneously for an optimal use of the CPU can be set. For each activity, a number of busy threads that are using the CPU can be determined. For each activity, a number of wasted threads that are threads not using the CPU by computing a difference between the target and the number of busy threads can be calculated. A CPU time usage for each activity can be generated by multiplying a time period of the activity by a value obtained by dividing the number of wasted threads by the number of busy threads. Data including the CPU time usage for at least one activity can be provided.

In some variations, one or more of the following can be additionally implemented either individually or in any suitable combination. The one or more computing threads for one or more activities can include at least two computing threads that operate in parallel. The at least one programmable processor can sample the computing program such that at least one sample is generated for each computing thread. The generating of at least one sample for each computing thread can enable the following for each computing thread: the determining of the number of busy threads, the calculating of the number of wasted threads, and the generating of the CPU time usage. The CPU can be one of a plurality of CPUs, the plurality of CPUs being optimally used when the number of busy threads is equal to the target. The at least one programmable processor can store the CPU time usage for each activity in a main memory of the computing system. The CPU time usage that is sent by the at least one programmable processor can be the CPU time usage stored in the main memory. The at least one programmable processor can send the CPU time usage for each activity to a computing device that is external to the computing system. The CPU usage time can be used (by a developer, for example) to modify the execution of the computer program such that the modified computer program is more efficient that the computer program before the modification. The providing of the data including the CPU time usage for at least one activity can include at least one of: displaying the CPU time usage on a graphical user interface operatively coupled to the at least one programmable processor, storing the data including the CPU time usage in a database operatively coupled to the at least one programmable processor, storing the data including the CPU time usage into a main memory operatively coupled to the at least one programmable processor, and transmitting the data including the CPU time usage to another computing system that is remote from the computing system.

In yet another aspect, a system is described that can include at least one processor and a main memory. The at least one processor can identify an activity of a plurality of activities serviced by a central processing unit (CPU). The activity can be performed by one or more computing threads of a plurality of computing threads executing a plurality of subroutines of a computer program. The at least one processor can set a target representing a total number of computing threads that are required to work simultaneously for a maximal use of the CPU. The at least one processor can determine a number of busy threads that are performing the activity by using the CPU. The at least one processor can calculate, by computing a difference between the target and the number of busy threads, a number of wasted threads that are not performing the activity and not using the CPU. The at least one processor can generate a CPU time usage for the activity by multiplying time of the activity by a value obtained by dividing the number of wasted threads by the number of busy threads. The main memory can store the CPU time usage.

In some variations, one or more of the following can be additionally implemented either individually or in any suitable combination. The at least one processor can be operatively coupled to the main memory. The at least one processor and the main memory can be a part of a computing system. The one or more computing threads for one or more activities can include at least two computing threads that operate in parallel. The at least one processor can sample the computing program such that at least one sample is generated for each computing thread. The generating of at least one sample for each computing thread can enable the following for each computing thread: the determining of the number of busy threads, the calculating of the number of wasted threads, and the generating of the CPU time usage. The system can further include at least one of: a graphical user interface to render the CPU time usage, the graphical user interface operatively coupled to the at least one processor; a database to store data including the CPU time usage, the database operatively coupled to the at least one processor; a main memory to store the data including the CPU time usage, the main memory operatively coupled to the at least one processor; and a computing device to receive the data including the CPU time usage sent by the at least one processor via a communication network. The computing device can execute an application that enables an analysis of the CPU usage time to modify execution of the computer program.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
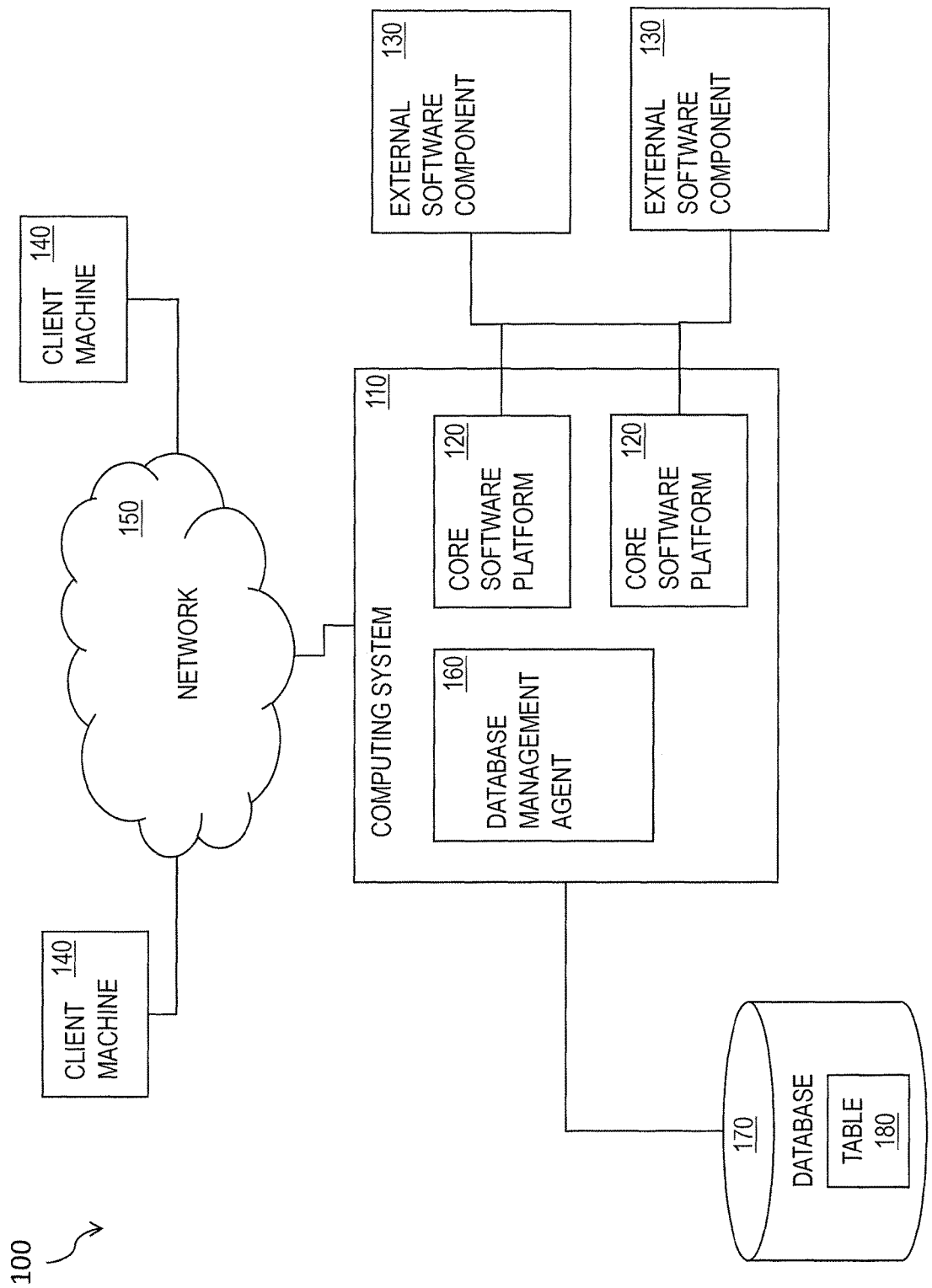
FIG. 1 is a diagram a software system architecture that can determine a CPU time usage for at least one activity of a plurality of activities serviced by a central processing unit (CPU).

The current subject matter can be implemented in a variety of computing systems including, for example, computing system 110 in diagram 100 of FIG. 1. The computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

The computing system 110 handles multiple threads in parallel. With the current subject matter, samples can be taken on each of the threads. Further, each thread can have history about the last sample and the accumulated CPU time being used on that thread.

However, more is required for accounting for unused threads. Given a hint about the number of threads for the system to use as a target, the number of busy threads during a sample can be counted. In addition, the number of threads of the target number of threads that are in wait state or idle can be counted.

In other words, the difference of the target and the actual number of busy threads can be calculated. If that number is positive, then there are idle threads, so for each busy thread, the measured CPU time can be multiplied by that difference divided by the number busy threads. If the difference is zero or negative, no accounting is needed for measured CPU times because, in this case, there is no CPU waste that requires measuring.

Figure 2:
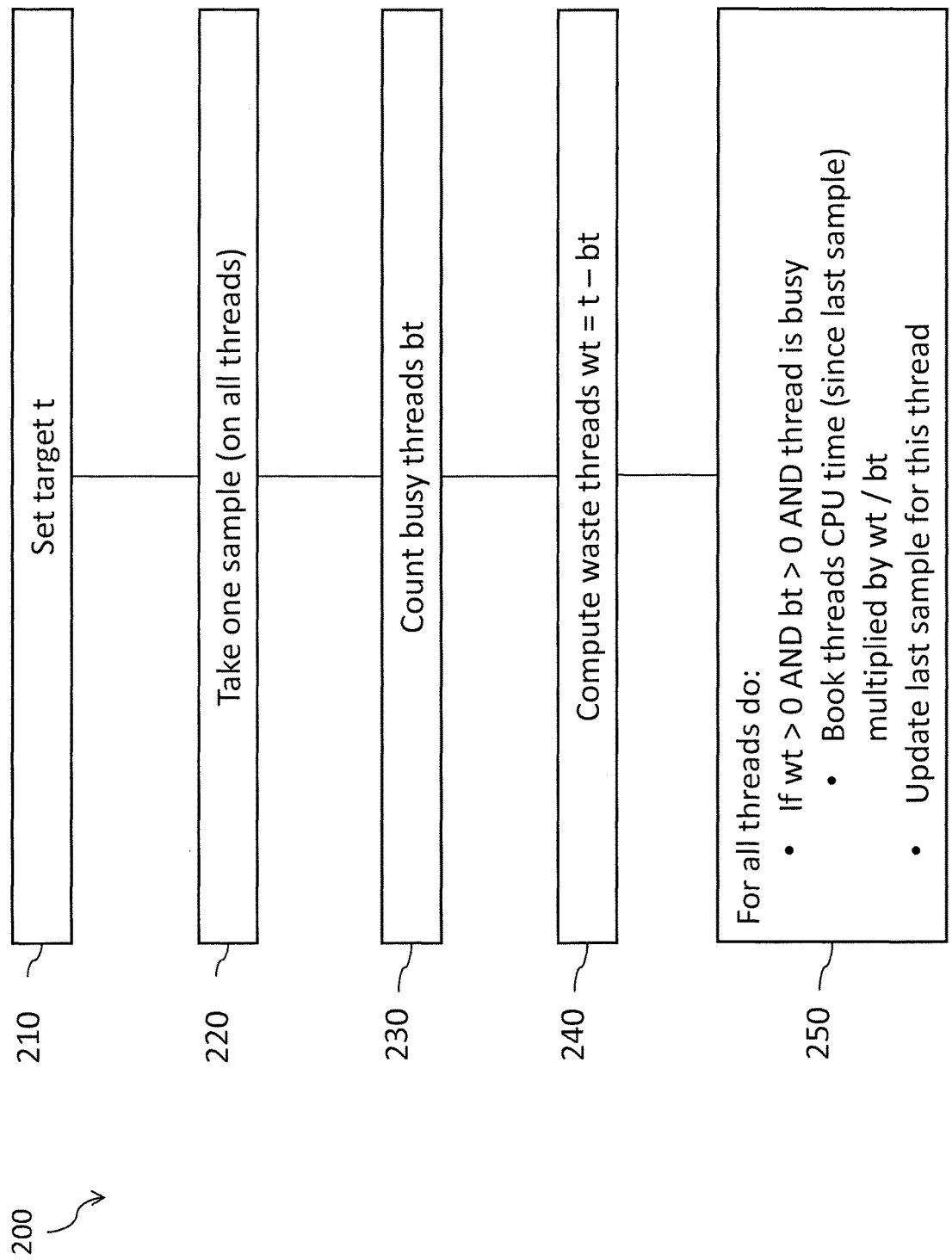
FIG. 2 is a process flow diagram illustrating a first CPU waste profiling algorithm used to compute a CPU time usage for at least one activity of a plurality of activities serviced by a central processing unit (CPU).

With reference to diagram 200 of FIG. 2, initially, at 210, the target t is set. Thereafter, at 220, one sample is taken on all threads. The number of busy threads bt is then, at 230, counted. Next, at 240, the waste wt=t−bt is computed. Subsequently, at 250, for all threads do: if wt>0 AND bt>0 AND thread is busy, book threads CPU time (since last sample) multiplied by wt/bt, and update last sample for this thread.

Figure 3:
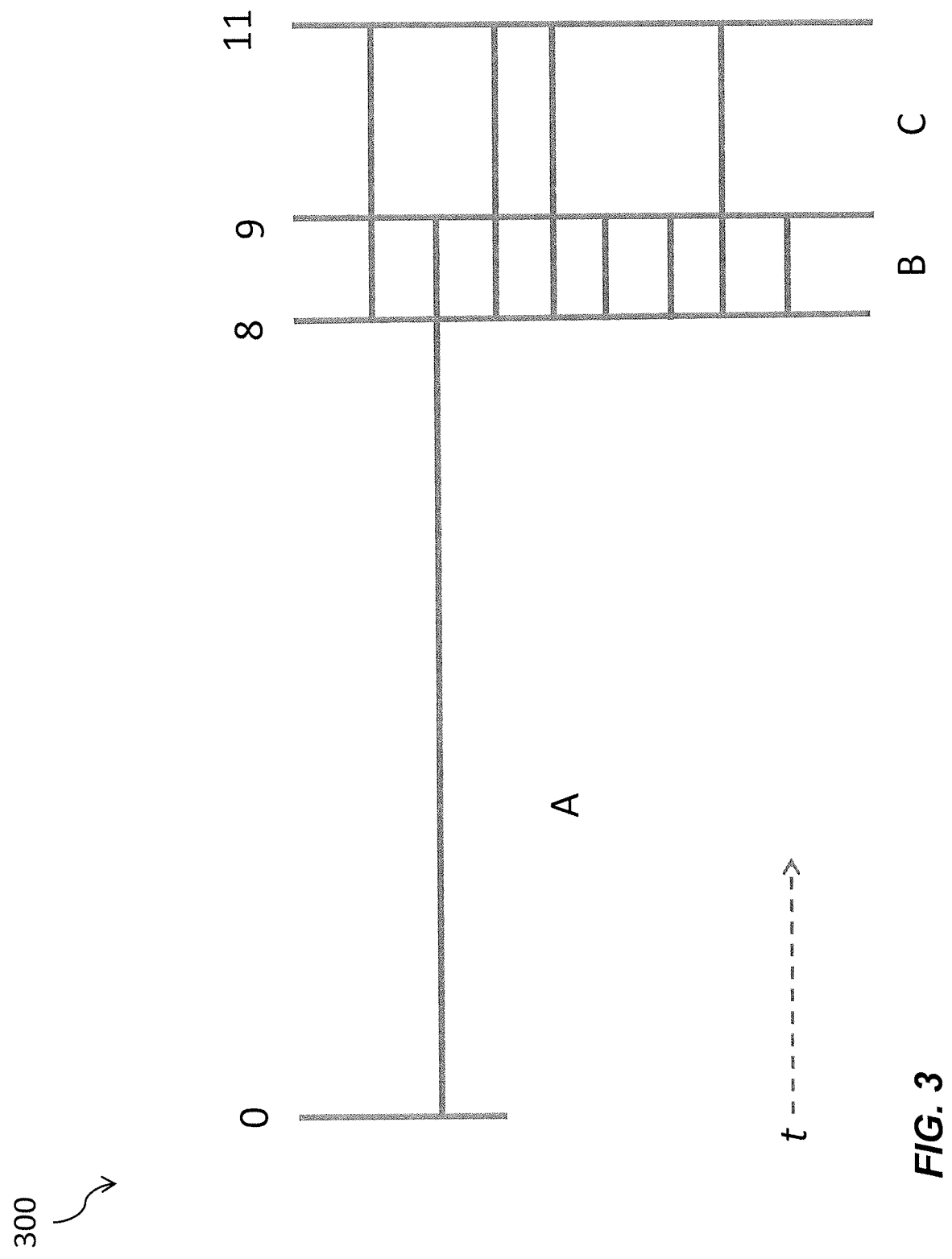
FIG. 3 is a diagram illustrating one example of determining a CPU time usage for at least one activity of a plurality of activities serviced by a central processing unit (CPU).

Diagram 300 of FIG. 3 illustrates work that consists of 8 seconds serial execution (A) followed by another 8 seconds being executed in parallel (B) on 8 threads, followed by yet another 8 seconds of work (C) being executed on 4 threads. The classical profiling would tell us that A, B and C are getting 8 seconds of CPU each, or 33%, but that does not indicate how the total of 11 seconds of execution time is spent.

With reference again to diagram 300 of FIG. 3, time is on the X-axis, 0 8, 9, and 11 seconds are indicated. The rows are the threads, and the visible part is where the thread is busy. The target for the measurement in this example is 8 threads. Then, during the first 8 seconds, the samples see 1 busy thread A using all of the CPU, and 7 threads not doing work. So the samples CPU times (8 seconds each) would be multiplied by 7, accounting for 56 seconds of wasted CPU. Then in the ninth second, the samples will see 8 threads working B, but the difference is 0 so the CPU times will not be accounted. During the last two seconds, the samples see 4 busy threads and 4 idle threads, so the difference is 1 and C will get 8 seconds of waste.

In the end, FIG. 3 clearly shows that a developer should look mostly at the part A to improve, and then C. Part B is good as there is no waste because that part is already using all target threads (that are specified in 210).

A variant for the difference factor above is to use the number of busy threads from the last sample and take the average between the currently busy threads and the last busy threads, taking into account that the collected CPU times may partly belong the last sample. On average and in the long run, that does not make a difference, but for shorter profiler runs, this may enhance the precision of the measurement a little bit.

Figure 4:
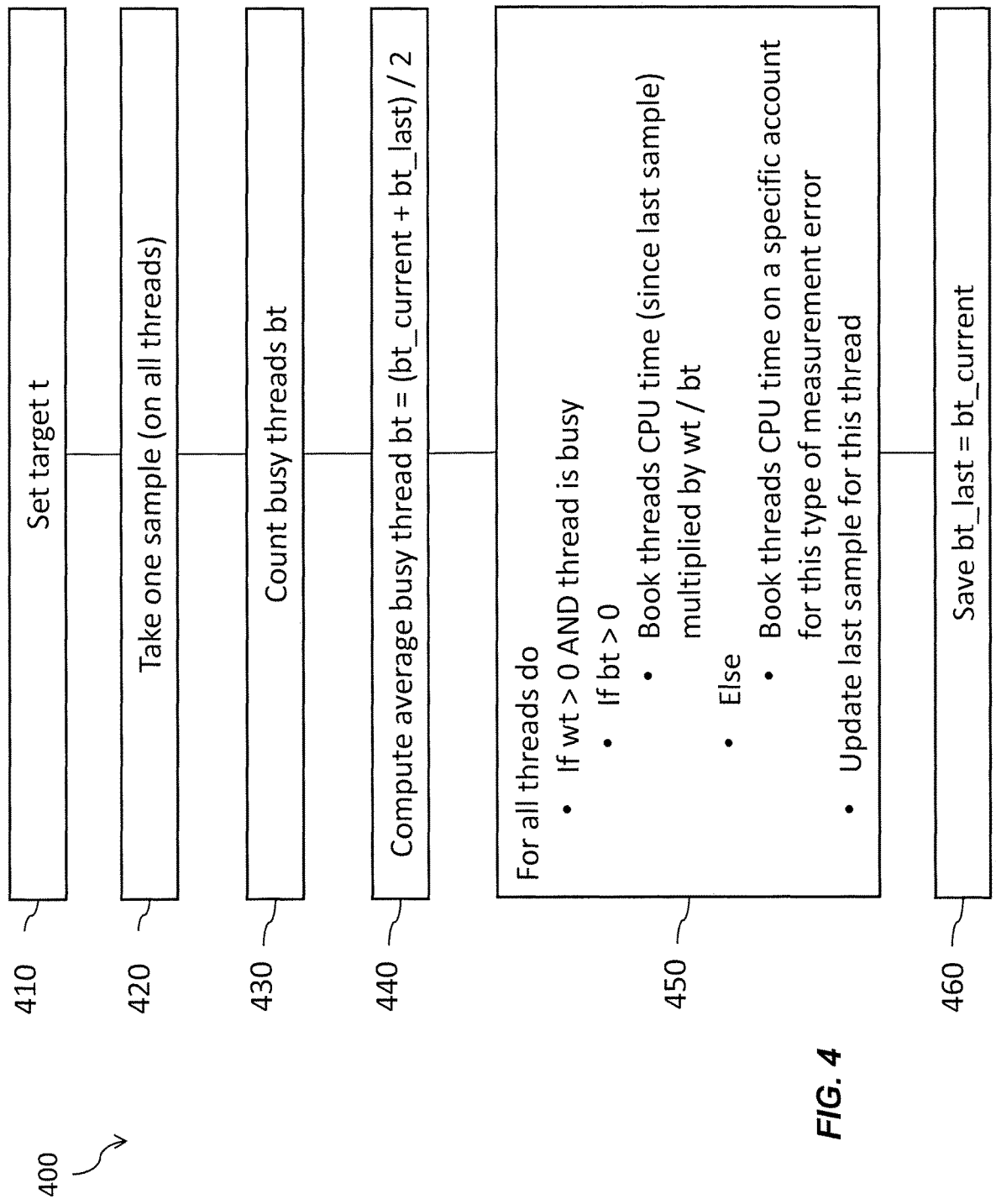
FIG. 4 is a process flow diagram illustrating a second CPU waste profiling algorithm used to compute a CPU time usage for at least one activity of a plurality of activities serviced by a central processing unit (CPU). As compared to the first CPU waste profiling algorithm, the second waste profiling algorithm additionally accounts for certain measurement errors.

In the algorithm above, when it happens that bt=0, this means that there are no busy threads at all. If there is no CPU time being collected, this is not a problem, but if CPU time was collected, there is a need to book that CPU time somewhere to indicate that there might be measurement errors. With reference to diagram 400 of FIG. 4, at 410, the target t is set. Thereafter, at 420, one sample is taken on all threads. Next, at 430, the busy threads bt_current are counted and, at 440, the average busy thread bt=(bt_current+bt_last)/2 is counted. Subsequently, at 440, the waste wt is calculated as the difference between the target t and the busy threads bt (wt=t−bt). Next, at 450, for all threads do:

a. If wt>0 AND thread is busy
  i. If (bt>0
  Book threads CPU time (since last sample) multiplied by wt/bt
  ii. Else
  Book threads CPU time on a specific account for this type of measurement error
b. Update last sample for this thread Finally, at 460, save busy thread last as busy thread current: bt_last=bt_current.

Figure 5:
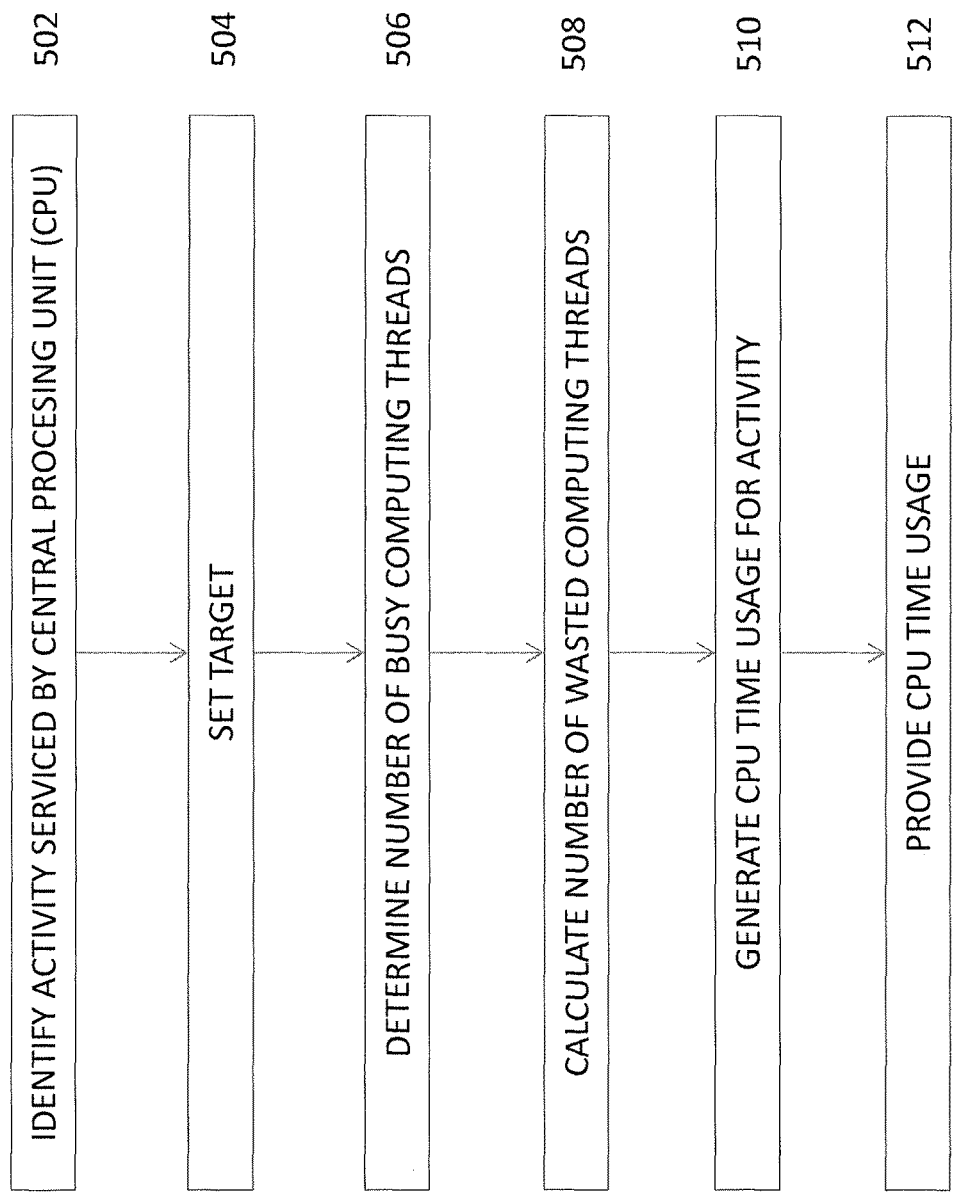
FIG. 5 illustrates a process flow diagram illustrating determining a CPU time usage for at least one activity of a plurality of activities serviced by a central processing unit (CPU).

FIG. 5 illustrates a process flow diagram 500 illustrating determining a CPU time usage for at least one activity of a plurality of activities serviced by a central processing unit (CPU). At least one processor of a computing system can identify, at 502, an activity of a plurality of activities serviced by a central processing unit (CPU). Each activity can be performed by one or more computing threads of a plurality of computing threads executing a plurality of subroutines of a computer program. The at least one processor can set, at 504, a target representing a total number of computing threads that are required to work simultaneously for a maximal use of the CPU. The at least one processor can determine, at 506, a number of busy computing threads that are performing the activity by using the CPU. The at least one processor can calculate, at 508, a number of wasted computing threads that are not performing the activity and not using the CPU by computing a difference between the target and the number of busy threads. The at least one processor can generate, at 510, a CPU time usage for the activity by multiplying a time duration of the activity by a value obtained by dividing the number of wasted threads by the number of busy threads. The at least one processor can provide, at 512, data including the CPU time usage.

In some implementations, one or more of the following can be additionally implemented either individually or in any suitable combination. The one or more computing threads for one or more activities can include at least two computing threads that operate in parallel. At least one processor can sample the computing program such that at least one sample is generated for each computing thread. The generating of at least one sample for each computing thread can enable: the determining of the number of busy threads, the calculating of the number of wasted threads, and the generating of the CPU time usage, for each computing thread. The CPU time can be sent to a computing device that is external to the computing system. The CPU time usage for the activity can be used (for example, by a developer) to modify execution of the computer program. The modified execution of the computer program can be more efficient than execution of the computer program before the modification. The CPU can be one of a plurality of CPUs. Each of the CPU and the plurality of CPUs can be maximally used when the number of busy threads is equal to the target. The providing of the data including the CPU time usage can include at least one of: causing the CPU time usage to be rendered in a graphical user interface operatively coupled to the at least one processor, storing the data including the CPU time usage in a database operatively coupled to the at least one processor, storing the data including the CPU time usage into a memory operatively coupled to the at least one processor, and transmitting the data including the CPU time usage to another computing system that is remote from the computing system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claim.

What is claimed is:

1. A method comprising:
   identifying, by at least one processor of a computing system, an activity of a plurality of activities, the activity being serviced by a plurality of central processing units (CPUs), and the activity being performed by one or more computing threads of a plurality of computing threads executing a plurality of subroutines of a computer program;
   counting, by the at least one processor, a number of active computing threads that are performing the activity during each of a plurality of separate time periods to generate a count for each of the plurality of separate time periods, the count being a sum of a first quantity of computing threads that perform the activity by being executed in parallel on multiple CPUs and a second quantity of computing threads that perform the activity by being executed in sequence on a single CPU;
   setting, by the at least one processor, a target number of active computing threads;
   determining, by the at least one processor, an actual number of active computing threads that are performing the activity within a particular time period of the plurality of separate time periods by using the plurality of CPUs;
   calculating, by the at least one processor, a number of inactive computing threads that are not performing the activity within the particular time period and not using the plurality of CPUs by computing a difference between the target number of active computing threads and the actual number of active computing threads;
   generating, by the at least one processor, a central processing unit time usage for the activity by multiplying a time duration of the activity by a value obtained by dividing the number of inactive computing threads by the actual number of active computing threads; and
   modifying, based at least on the central processing unit time usage, an execution of the computer program to at least minimize the difference between the actual number of active computing threads and the target number of active computing threads.

2. The method of claim 1, wherein the one or more computing threads for one or more activities include at least two computing threads.

3. The method of claim 1, further comprising:
   sampling, by the at least one processor, the computing program such that at least one sample is generated for each computing thread, the generating of at least one sample for each computing thread enabling: the determining of the actual number of active computing threads, the calculating of the number of inactive computing threads, and the generating of the central processing unit time usage, for each computing thread.

4. The method of claim 1, wherein each of the plurality of CPUs are maximally used when the actual number of active computing threads is equal to the target number of active computing threads.

5. The method of claim 1, wherein the providing of the data comprising the central processing unit time usage comprises:
   causing the central processing unit time usage to be rendered in a graphical user interface operatively coupled to the at least one processor,
   storing the data comprising the central processing unit time usage in a database operatively coupled to the at least one processor,
   storing the data comprising the central processing unit time usage into a memory operatively coupled to the at least one processor, and
   transmitting the data comprising the central processing unit time usage to another computing system that is remote from the computing system.

6. A non-transitory computer program product storing instructions that, when executed by at least one programmable processor of a computing system, cause the at least one programmable processor to perform operations comprising:
   identifying, by at least one processor of a computing system, an activity of a plurality of activities, the activity being serviced by a plurality of central processing units (CPUs), and the activity being performed by one or more computing threads of a plurality of computing threads executing a plurality of subroutines of a computer program;
   counting, by the at least one processor, a number of active computing threads that are performing the activity during each of a plurality of separate time periods to generate a count for each of the plurality of separate time periods, the count being a sum of a first quantity of computing threads that perform the activity by being executed in parallel on multiple CPUs and a second quantity of computing threads that perform the activity by being executed in sequence on a single CPU;
   setting, by the at least one processor, a target number of active computing threads;
   determining, by the at least one processor, an actual number of active computing threads that are performing the activity within a particular time period of the plurality of separate time periods by using the plurality of CPUs;
   calculating, by the at least one processor, a number of inactive computing threads that are not performing the activity within the particular time period and not using the plurality of CPUs by computing a difference between the target number of active computing threads and the actual number of active computing threads;
   generating, by the at least one processor, a central processing unit time usage for the activity by multiplying a time duration of the activity by a value obtained by dividing the number of inactive computing threads by the actual number of active computing threads; and
   modifying, based at least on the central processing unit time usage, an execution of the computer program to at least minimize the difference between the actual number of active computing threads and the target number of active computing threads.

7. The non-transitory computer program product of claim 6, wherein the one or more computing threads for one or more activities include at least two computing threads.

8. The non-transitory computer program product of claim 6, further comprising:
   sampling, by the at least one programmable processor, the computing program such that at least one sample is generated for each computing thread, the generating of at least one sample for each computing thread enabling: the determining of the actual number of active computing threads, the calculating of the number of inactive computing threads, and the generating of the central processing unit time usage, for each computing thread.

9. The non-transitory computer program product of claim 6, wherein the plurality of CPUs are maximally used when the actual number of active computing threads is equal to the target number of active computing threads.

10. The non-transitory computer program product of claim 6, further comprising:
storing, by the at least one programmable processor, the central processing unit time usage for the activity in a main memory of the computing system, the central processing unit time usage that is sent by the at least one programmable processor being the central processing unit time usage stored in the main memory.

11. The non-transitory computer program product of claim 6, further comprising: providing of the data comprising the central processing unit time usage for the activity by at least displaying the central processing unit time usage on a graphical user interface operatively coupled to the at least one programmable processor, storing the data comprising the central processing unit time usage in a database operatively coupled to the at least one programmable processor, storing the data comprising the central processing unit time usage into a main memory operatively coupled to the at least one programmable processor, and/or transmitting the data comprising the central processing unit time usage to another computing system that is remote from the computing system.

12. A system comprising:
at least one data processor; and
at least one memory storing instructions, which when executed by the at least one data processor, result in operation comprising:
identifying, by at least one processor of a computing system, an activity of a plurality of activities, the activity being serviced by a plurality of central processing units (CPUs), and the activity being performed by one or more computing threads of a plurality of computing threads executing a plurality of subroutines of a computer program;
counting, by the at least one processor, a number of active computing threads that are performing the activity during each of a plurality of separate time periods to generate a count for each of the plurality of separate time periods, the count being a sum of a first quantity of computing threads that perform the activity by being executed in parallel on multiple CPUs and a second quantity of computing threads that perform the activity by being executed in sequence on a single CPU;
setting, by the at least one processor, a target number of active computing threads;
determining, by the at least one processor, an actual number of active computing threads that are performing the activity within a particular time period of the plurality of separate time periods by using the plurality of CPUs;
calculating, by the at least one processor, a number of inactive computing threads that are not performing the activity within the particular time period and not using the plurality of CPUs by computing a difference between the target number of active computing threads and the actual number of active computing threads;
generating, by the at least one processor, a central processing unit time usage for the activity by multiplying a time duration of the activity by a value obtained by dividing the number of inactive computing threads by the actual number of active computing threads; and
modifying, based at least on the central processing unit time usage, an execution of the computer program to at least minimize the difference between the actual number of active computing threads and the target number of active computing threads.

13. The system of claim 12, wherein the one or more computing threads for one or more activities include at least two computing threads.

14. The system of claim 12, wherein the at least one data processor is further configured to:
sample the computing program such that at least one sample is generated for each computing thread, the generating of the at least one sample for each computing thread enabling the determining of the actual number of active computing threads, the calculating of the number of inactive computing threads, and the generating of the central processing unit time usage.

15. The system of claim 12, further comprising one or more of:
a graphical user interface to render the central processing unit time usage, the graphical user interface operatively coupled to the at least one data processor;
a database to store data comprising the central processing unit time usage, the database operatively coupled to the at least one data processor; and
a main memory to store the data comprising the central processing unit time usage, the main memory operatively coupled to the at least one data processor.

16. The system of claim 12, wherein the data comprising the central processing unit time usage is sent, via a communication network, to a computing device that is remote and external to the at least one data processor.

17. The system of claim 16, wherein the computing device is configured to execute an application that enables an analysis of the central processing unit time usage to modify execution of the computer program.

* * * * *